(12) United States Patent
Jung et al.

(10) Patent No.: US 8,667,141 B2
(45) Date of Patent: Mar. 4, 2014

(54) METHOD AND SYSTEM FOR HANDLING LOAD ON A SERVICE COMPONENT IN A NETWORK

(75) Inventors: Gueyoung Jung, Rochester, NY (US); Jean-Pierre R M Van De Capelle, Rochester, NY (US); Tridib Mukherjee, Bangalore (IN)

(73) Assignee: Xerox Corporation, Norwalk, CT (US)

( * ) Notice: Subject to any disclaimer, the term of this patent is extended or adjusted under 35 U.S.C. 154(b) by 52 days.

(21) Appl. No.: 13/540,639

(22) Filed: Jul. 3, 2012

(65) Prior Publication Data
US 2014/0012987 A1  Jan. 9, 2014

(51) Int. Cl.
*G06F 15/173* (2006.01)
(52) U.S. Cl.
USPC ............................ 709/226; 709/223; 709/225

(58) Field of Classification Search
None
See application file for complete search history.

(56) References Cited

U.S. PATENT DOCUMENTS

| 7,613,680 B2 * | 11/2009 | Takahashi et al. ................ 1/1 |
| 8,144,587 B2 * | 3/2012 | Heinz et al. .................. 370/235 |
| 2005/0177633 A1 * | 8/2005 | Plunkett ....................... 709/225 |
| 2008/0052387 A1 * | 2/2008 | Heinz et al. .................. 709/223 |

* cited by examiner

*Primary Examiner* — Umar Cheema (57) ABSTRACT

A method, a system and a computer program product for handling requests in a network are disclosed. A load pattern at a first service component is extracted. A capacity and pending requests at the first service component are calculated based on the load pattern. Thereafter, an insertion delay is calculated based on the capacity, pending requests, and a time period required to increase the capacity by applying various alternative adaptation techniques. The insertion delay is then distributed among a plurality of upstream service components.

17 Claims, 8 Drawing Sheets

METHOD AND SYSTEM FOR HANDLING LOAD ON A SERVICE COMPONENT IN A NETWORK

COPYRIGHT NOTICE

A portion of the disclosure of this patent document contains material that is subject to copyright protection. The copyright owner has no objection to facsimile reproduction by anyone of the patent document or the patent disclosure as it appears in the Patent and Trademark Office patent file or records but otherwise reserves all copyright rights whatsoever.

TECHNICAL FIELD

The presently disclosed embodiments are directed to computer networks. More particularly, the presently disclosed embodiments are directed to a technique for managing a load on a service component in a network.

BACKGROUND

Currently, many enterprises attempt to deploy their workflows into cloud environments. A workflow is composed of various software services, each of which deals with various subtasks. With the advent of cloud computing, such software services can be developed as cloud-based services and executed in cloud infrastructures. By outsourcing those cloud-based services and cloud infrastructures, enterprises are able to deploy their workflows into a federation of clouds or data centers with optimized execution time and cost. The workflows deployed into a cloud-based computing architecture may suffer from sudden load surges and system crashes. This may result in some adverse user experiences, especially when multiple service workflows share common service components and then, simultaneously push loads (e.g., requests) into the common service components. To address this problem, various alternative adaptation techniques, such as, a dynamic resource provisioning technique, a prediction-based resource provisioning technique and a re-planning technique are used.

The dynamic resource provisioning technique can be implemented to meet various Service Level Agreements (SLAB). This is typically used to address a gradual increase in workload, rather than load surges that have a relatively short duration. It is impractical to apply the dynamic resource provisioning technique to such urgent situations, since it takes a considerable amount of time to provision resources dynamically, and it can be too late for such short surges.

The prediction-based resource provisioning technique can be used to meet various SLAB using workload prediction techniques. However, the prediction is often inherently too risky or conservative. When the prediction-based resource provisioning technique underestimates the size of the loads, which potentially leads to SLA violations, it must perform instant re-provisioning. On the contrary, when the prediction-based resource provisioning technique overestimates the size of the loads, it increases resource usage cost due to the over-provisioning.

The re-planning (e.g., re-deploying workflows) technique, can be used as an alternative method. However, due to various service dependencies in a workflow, service redeployment will affect the performance of all downstream service components and require their redeployment as well. This can be very expensive in terms of delay and service downtime.

In view of the foregoing, there is a need for a technique to manage such load surges.

SUMMARY

According to embodiments illustrated herein, there is provided a method for handling requests in a network. A load pattern is extracted at a first service component. The first service component receives one or more requests from a plurality of upstream service components. Further, a capacity of the first service component and one or more pending requests at the first service component is calculated based on the load pattern. The capacity corresponds to a maximum number of requests which can be served by the first service component in a predefined time period. Based on the capacity and the one or more pending requests, a first delay associated with the first service component is computed. Further, a second delay is computed based on a time period required to increase the capacity by applying one or more alternative adaptation techniques. An insertion delay is determined, based on the first delay and the second delay. The insertion delay is then distributed among the plurality of upstream service components such that requests from the plurality of upstream service components are not simultaneously received at the first service component.

According to embodiments illustrated herein, there is provided a system for handling requests in a network. The system includes a load calculation module for extracting a load pattern at a first service component. The first service component receives one or more requests from a plurality of upstream service components. A delay calculation module calculates a capacity of the first service component and one or more pending requests at the first service component based on the load pattern. The capacity corresponds to a maximum number of requests served by the first service component in a predefined time period. The delay calculation module also determines an insertion delay based on at least one of the capacity, the one or more pending requests, or a time period required for increasing the capacity by one or more alternative adaptation techniques. A delay distribution module distributes the insertion delay among the plurality of upstream service components such that requests from the plurality of upstream service components are not simultaneously received at the first service component.

According to embodiments illustrated herein, there is provided a computer program product for handling requests in a network. The computer program product includes a computer-readable program code. The computer-readable program code includes a program instruction means for extracting a load pattern at a first service component. The first service component is configured to receive one or more requests from a plurality of upstream service components. A program instruction means is provided for calculating a capacity of the first service component and one or more pending requests at the first service component, based on the load pattern. The capacity corresponds to a maximum number of requests which can be served by the first service component in a predefined time period. The computer-readable program code further includes a program instruction means for determining an insertion delay based on at least one of the capacity, the one or more pending requests, or a time period required to increase the capacity by one or more alternative adaptation techniques. There is also provided a program instruction means for distributing the insertion delay among the plurality of upstream service components such that requests from the plurality of upstream service components are not simultaneously received at the first service component.

BRIEF DESCRIPTION OF DRAWINGS

The accompanying drawings, which are incorporated in the patent application, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples, one element may be designed as multiple elements or that multiple elements may be designed as one element. In some examples, an element shown as an internal component of another element may be implemented as an external component and vice versa. Furthermore, elements may not be drawn to scale.

Various embodiments will hereinafter be described in accordance with the appended drawings provided to illustrate and not to limit the scope in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed description given herein with respect to these figures is just for explanatory purposes as the method and the system extend beyond the described embodiments. For example, those skilled in the art will appreciate, in light of the teachings presented, recognizing multiple alternate and suitable approaches, depending on the needs of a particular application, to implement the functionality of any detail described herein, beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but not every embodiment or example necessarily includes that particular feature, structure, characteristic, property, element or limitation. Furthermore, repeated use of the phrase "in an embodiment" does not necessarily refer to the same embodiment, though it may.

The following terms shall have, for the purposes of this application, the respective meanings set forth below.

A "cloud" or "cloud network" refers to a network of computing systems such as a wide area network (WAN), like the Internet or a local area network (LAN). The cloud includes various computers, servers and data storage systems to facilitate various computing services. The cloud computing services may be accessed through the Internet.

Types of cloud include a public cloud, a community cloud, a private cloud and a hybrid cloud. In the public cloud, various applications, storage, and other resources are made available to the general public by a service provider. Access to public cloud services is free or offered on a pay-per-use model. In a community cloud, cloud infrastructure is shared among various organizations from a particular community with common concerns (e.g., compliance, security, etc.). The community cloud may be managed by these organizations internally or by a third party. The private cloud is a cloud infrastructure operated only for a single organization. The private cloud can be managed internally by the organization or by any third party. Further, the private cloud can be hosted internally (e.g., in the organization) or externally. The hybrid cloud is a cloud infrastructure implementing two or more cloud types (e.g., the public cloud, the community cloud and the private cloud).

A "service component" refers to software, hardware (e.g., the computers, servers and data storage systems in the cloud), application programs, or the like. Each service component performs an associated subtask.

"Upstream service components" to a service component refer to various service components from which the service component receives requests (e.g., load).

"Downstream service components" to a service component refer to various service components to which the service component forwards requests (e.g., load).

A "workflow" refers to an ordered list of services used to perform a particular operation. The workflow may include one or more services (e.g., subtasks) that can each be performed at the corresponding service component in the cloud.

A "load surge" at a service component refers to an increase in requests (e.g., load) received at the service component in a certain period.

Figure 4A:
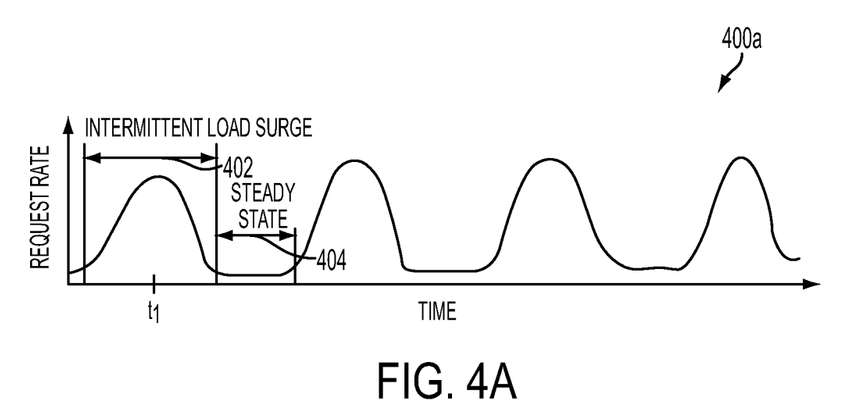
FIG. 4a depicts a load pattern at a single service component in accordance with at least one embodiment.

A "load pattern" at a service component refers to pattern of incoming requests at the service component. The load pattern represents number of requests received by the service component on a time scale. One such, load pattern (400a) is depicted in FIG. 4.

Figure 1:
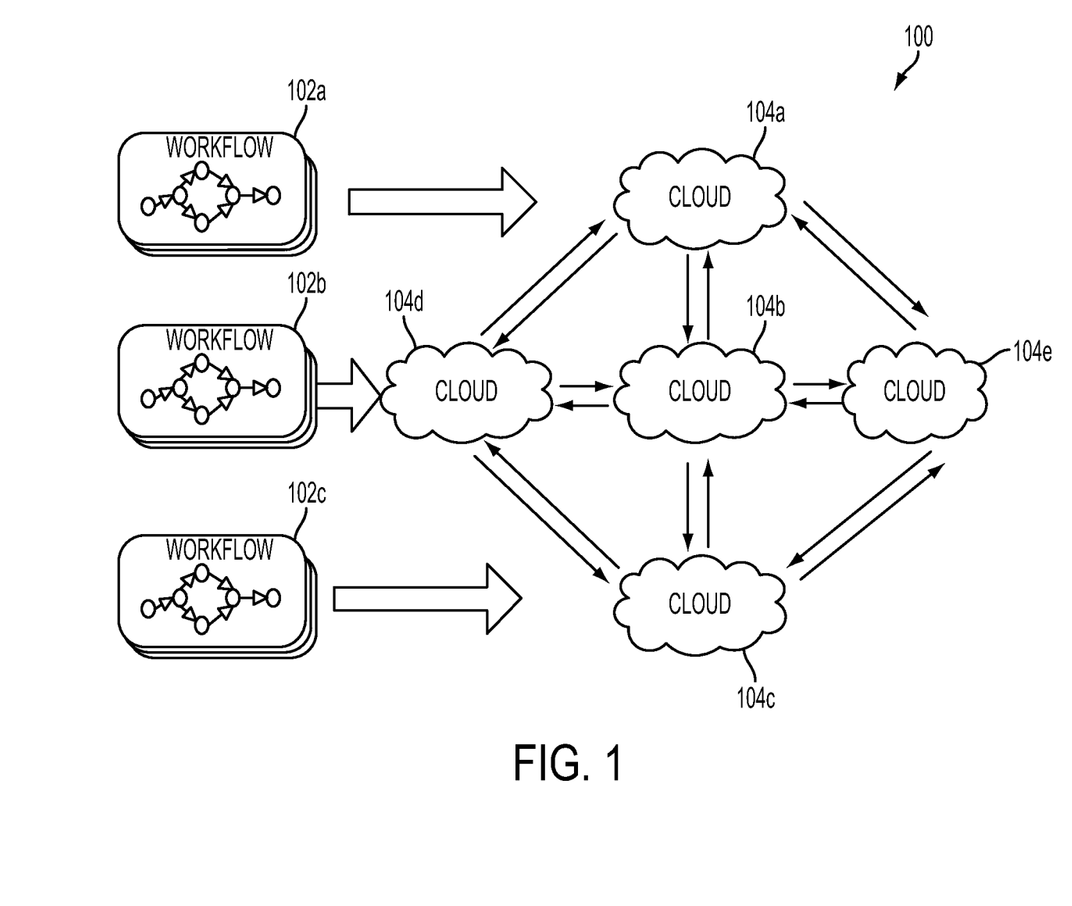
FIG. 1 is a block diagram illustrating an environment in accordance with at least one embodiment.

FIG. 1 is a block diagram illustrating an environment 100 in accordance with at least one embodiment. The environment 100 depicts one or more workflows 102a, 102b and 102c (hereinafter referred to as workflows 102). The workflows 102 are deployed into one or more clouds 104a, 104b, 104c, 104d and 104e (hereinafter referred to as clouds 104). In order to execute the workflows 102, various services in the workflows 102 are performed in the clouds 104. One such cloud (the cloud 104a) is explained in detail in conjunction with FIG. 2.

Figure 2:
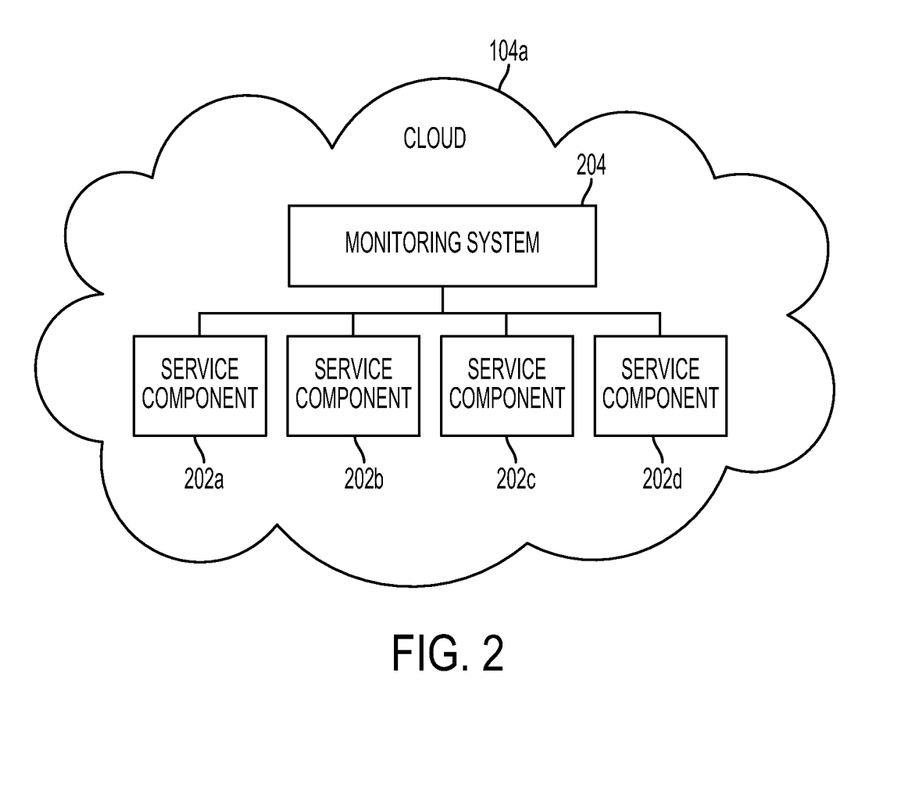
FIG. 2 is a block diagram illustrating a cloud in accordance with at least one embodiment.

FIG. 2 is a block diagram illustrating the cloud 104a in accordance with at least one embodiment. The cloud 104a includes service components 202a, 202b, 202c, and 202d (hereinafter referred to as service components 202), and a monitoring system 204. The service components 202 perform associated subtasks in order to serve the workflows 102. For example, when a request arrives at the service component 202a, the subtask associated with the request is performed by the service component 202a. The request is then forwarded to downstream service components in the cloud 104a (e.g., the service components 202b, 202c and 202d) or service components in other clouds (e.g., the clouds 104b, 104c, 104d and 104e). In an embodiment, the one or more of the service components 202 can be shared by the workflows 102 (e.g., the service components 202 can serve requests from one or more of the workflows 102).

The monitoring system 204 monitors requests coming to the service components 202 to determine a load pattern on the service components 202. Based on the load pattern, the monitoring system 204 determines the arrival of a load surge and accordingly introduces delays into various upstream service components so that requests from the various upstream service components are not received simultaneously at any service component. This is further explained in detail in the description below.

For the simplicity of explanation, only a single cloud (e.g., the cloud 104a) is explained here. Other clouds (e.g., the clouds 104b, 104c, 104d and 104e) can also have various service components and corresponding monitoring systems, such as the monitoring system 204.

Figure 3:
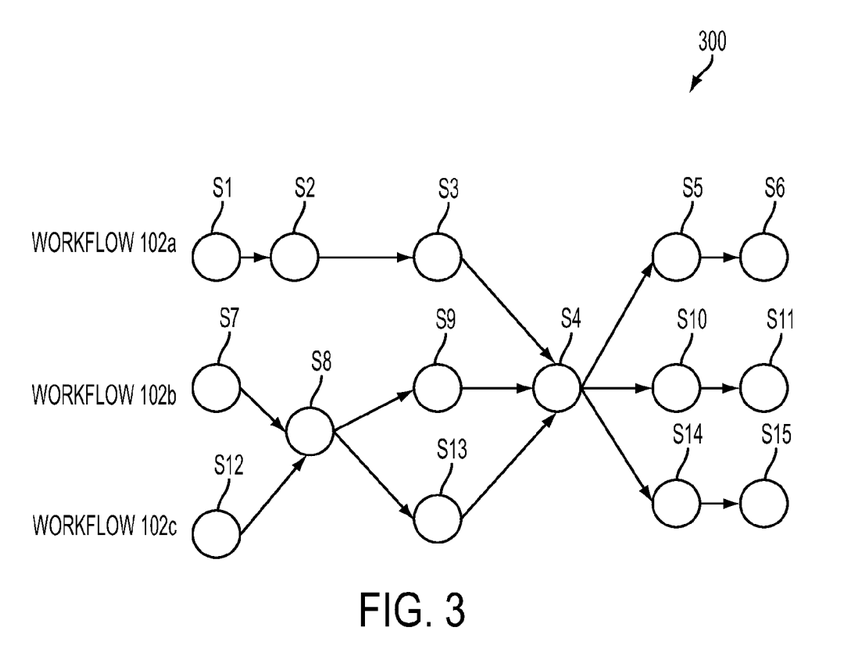
FIG. 3 is a block diagram illustrating a flow of requests in various workflows in accordance with at least one embodiment.

FIG. 3 is a block diagram 300 illustrating the flow of requests in various workflows (e.g., the workflow 102a, the workflow 102b and the workflow 102c) in accordance with at least one embodiment. It is depicted that the workflow 102a is deployed using service components S1-S6. The workflow 102b is deployed using service components S7-S11 and S4. The workflow 102c is deployed using service components S12-S15, S4 and S8.

It should be understood by a person having ordinary skill in the art that the service components S1-S15 can be part of any of the clouds 104 without departing from the scope of the ongoing description.

It is depicted that the service component S4 is shared by the workflow 102a, the workflow 102b and the workflow 102c. The service components S3, S9 and S13 may push their load surges into the service component S4 simultaneously, as the service component S4 is shared by the workflows 102. In an embodiment, because of the dependency of the service component S4 on the service components S3, S9 and S13, a rate at which load arrives at the service component S4, depends on a service rate at the service components S3, S9 and S13. For example, a bottleneck (e.g., a severe load surge condition) at the service component S4 not only depends on an incoming load rate from the service components S3, S9 and S13 but also on how fast these service components can serve a load. If the service components S3, S9 and S13 serve the load at the same rate, then their load surges propagate to the service component S4 simultaneously, hence causing a bottleneck at the service component S4.

FIG. 4a depicts a load pattern 400a at a single service component (e.g., the service component S4) in accordance with at least one embodiment. Duration 402 represents a load surge appearing at the service component. Duration 404 represents a steady state at the service component.

Figure 4B:
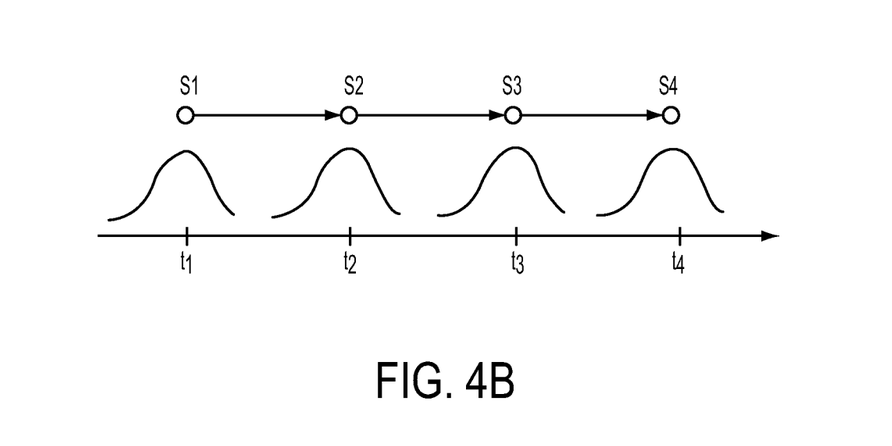
FIG. 4b depicts the propagation of a single load surge along a workflow in accordance with at least one embodiment.

FIG. 4b depicts the propagation of a single load surge along a workflow (e.g., the workflow 102a) in accordance with at least one embodiment. The service component S4 observes the load surge at $t_4$, after the service component S3 has observed it at $t_3$, where $t_4 > t_3$. It is observed that the load surge is propagated to the service component S4 from the service component S1 through the service components S2 and S3.

Figure 5:
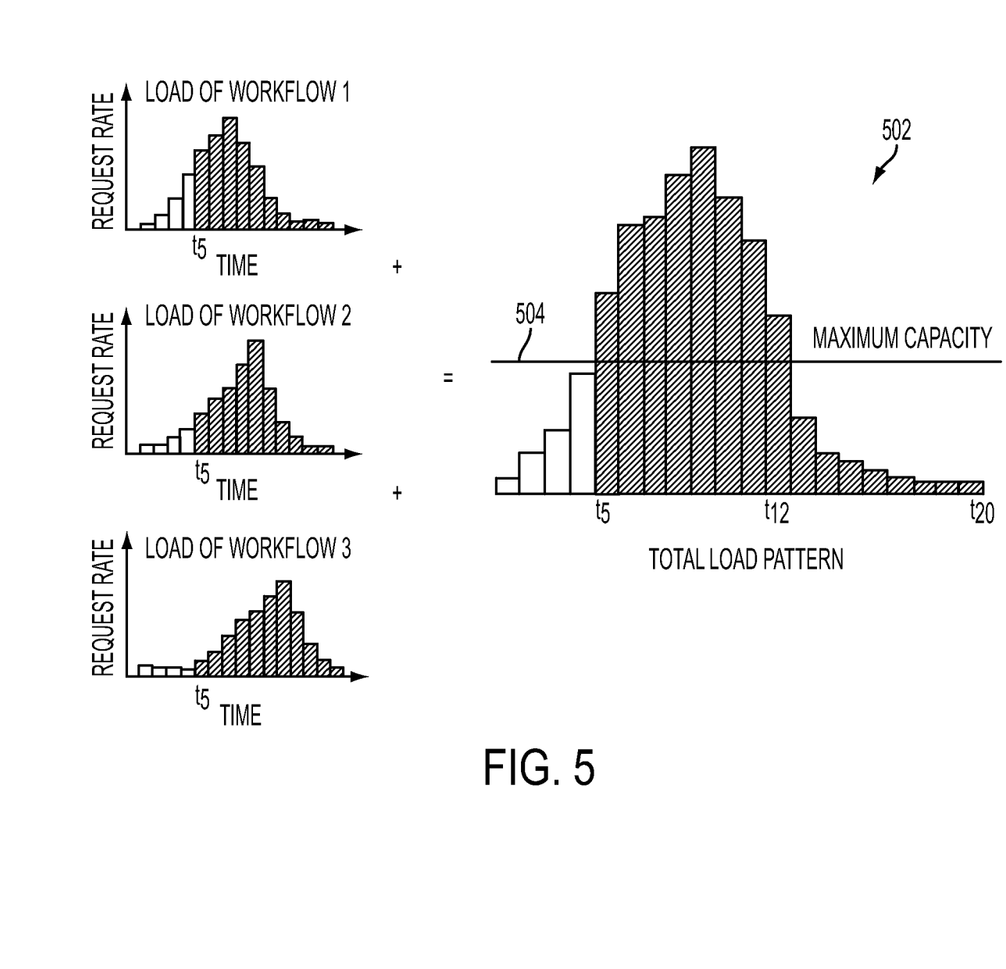
FIG. 5 depicts load patterns of various workflows and a total load pattern of all the workflows in accordance with at least one embodiment.

FIG. 5 depicts load patterns of various workflows (e.g., the workflows 102) and a total load pattern 502 of all the workflows in accordance with at least one embodiment. The total load pattern 502 represents a summation of load patterns from the workflow 102a, 102b and 102c. A line 504 represents a capacity of the service component S4. The capacity corresponds to a maximum number of requests that can be served by the service component S4 in a predefined time period.

Figure 6:
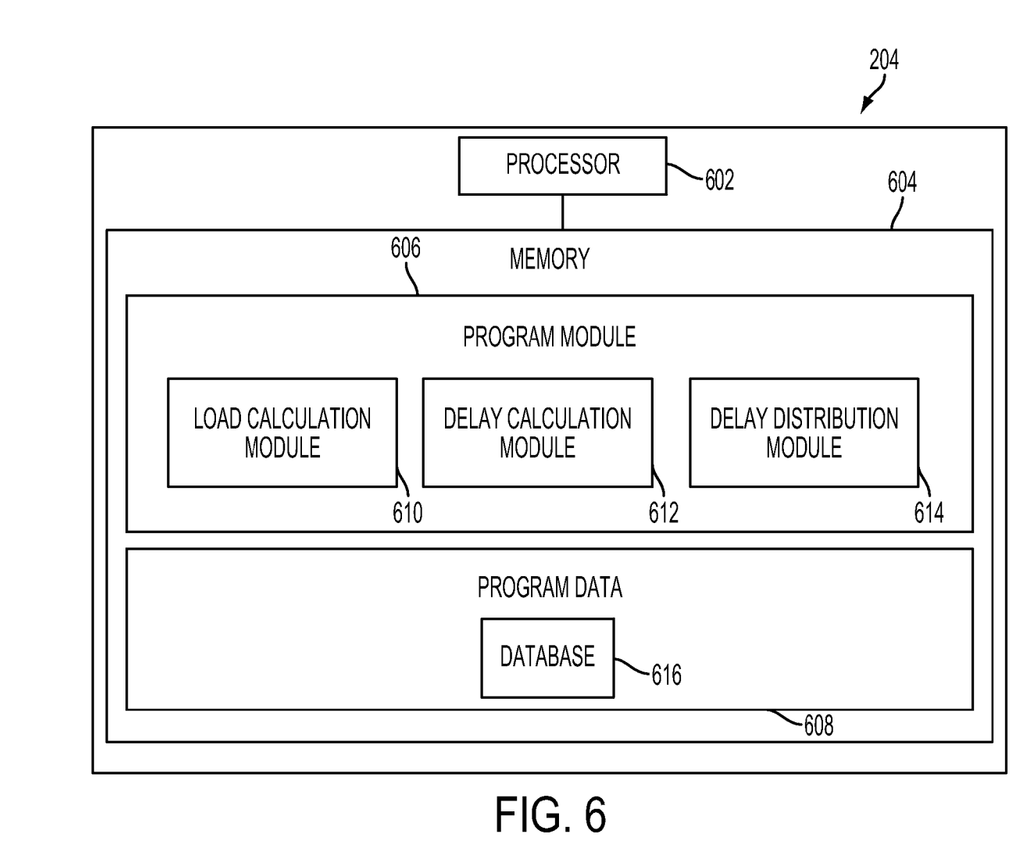
FIG. 6 is a block diagram illustrating a monitoring system in accordance with at least one embodiment.

FIG. 6 is a block diagram illustrating the monitoring system 204 in accordance with at least one embodiment. The monitoring system 204 includes a processor 602 and a memory 604. The memory 604 includes a program module 606 and a program data 608. The program module 606 includes a load calculation module 610, a delay calculation module 612 and a delay distribution module 614. The program data 608 includes a database 616.

The load calculation module 610 extracts a load pattern (such as the load pattern 400a as depicted in FIG. 4a) at the service component S4 (the service component S4 can be any service component like the service components 202 or any other service component in the other clouds). In an embodiment, the load calculation module 610 implements a change point detection technique to analyse the load pattern. This is further explained in conjunction with FIG. 7. The load calculation module 610 then stores the extracted load pattern into the database 616.

The delay calculation module 612 retrieves the load pattern from the database and calculates the capacity of the service component S4 and one or more pending requests at the service component S4 based on the load pattern.

Once the capacity and the pending requests at the service component S4 are calculated, the delay calculation module 612 determines an insertion delay. The insertion delay is calculated based on at least one of the capacity, the one or more pending requests, or a time period required to increase the capacity by the alternative adaptation techniques. The alternative adaptation techniques include, but are not limited to, the dynamic resource provisioning technique, the prediction-based resource provisioning technique, a re-planning technique, and the like. The delay calculation module 612 then stores the calculated insertion delay into the database 616. The method of calculation of the insertion delay is further explained in detail in conjunction with FIG. 7.

The delay distribution module 614 retrieves the value of the insertion delay from the database 616 and then distributes the insertion delay into various upstream service components (e.g., the service components S1, S2, S3, S7, S8, S9, S12, and S13). The insertion delay is distributed such that the requests coming to the service component S4 from the upstream service components are delayed by different time periods. Hence, the service component S4 does not get overloaded and the overall performance can be improved.

The database 616 is a storage device that stores the data that may be required by the load calculation module 610, the delay calculation module 612 and the delay distribution module 614. In an embodiment, the database 616 can be implemented using technologies including, but not limited to, Oracle®, IBM DB2®, Microsoft SQL Server®, Microsoft Access®, PostgreSQL®, MySQL® and SQLite® and the like. In an embodiment, the database 616 may be implemented as cloud storage.

In brief, the load calculation module 610 extracts the load pattern at the service component S4 and stores the load pattern into the database 616. The delay calculation module 612 retrieves the load pattern from the database 616 and calculates the capacity and the pending requests at the service component S4 and stores the corresponding calculated values into the database 616. The delay calculation module 612 then calculates the insertion delay based on the capacity, the one or more pending requests and the time period required to increase the capacity by the alternative adaptation techniques.

The delay calculation module 612 stores the calculated insertion delay into the database 616. The delay distribution module 614 retrieves the value of the insertion delay from the database 616 and then distributes the insertion delay into various upstream service components such that requests from the upstream service components are not simultaneously received at the service component S4.

In an embodiment, the load calculation module 610, the delay calculation module 612, and the delay distribution module 614 can be implemented using various programming languages, such as, Java, C, C++, various script languages such as Python and the like. However, it should be understood by a person having ordinary skills in the art that any other suitable programming languages can also be used to implement the load calculation module 610, the delay calculation module 612, and the delay distribution module 614. In an embodiment, the load calculation module 610 and the delay calculation module 612 implements various techniques, such as machine learning, data mining, statistics, and artificial intelligent and the like.

Figure 7:
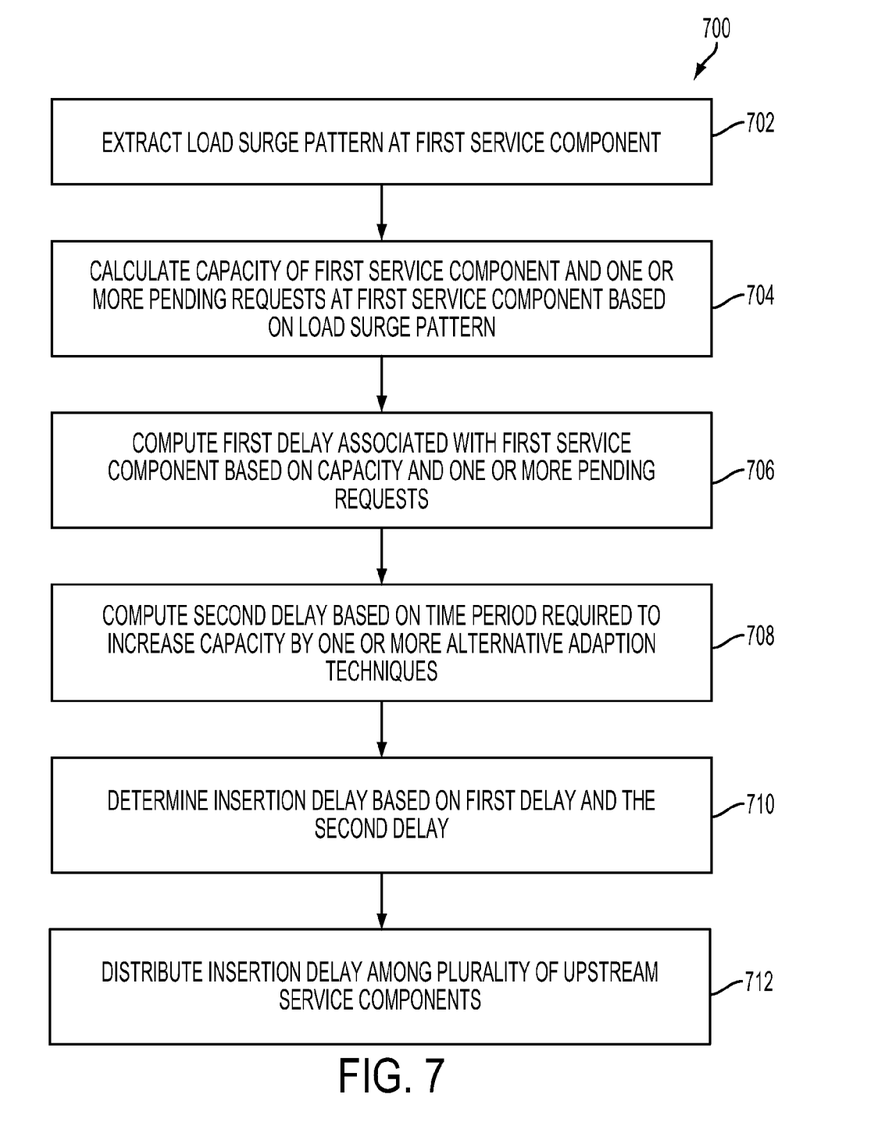
FIG. 7 is a flow diagram illustrating a method for handling requests in a network in accordance with at least one embodiment.

FIG. 7 depicts a flow diagram 700 illustrating a method for handling requests in a network in accordance with at least one embodiment.

At step 702, the load pattern 400a as depicted in FIG. 4a at the service component S4 is extracted.

Based on the load pattern, a starting point and an ending point of the load surge (e.g., the load surge as depicted in the duration 402) are computed and thereby, duration of the load surge and size of loads over the duration are estimated.

In an embodiment, the change point detection technique (e.g., a cumulative sum technique) is implemented by the load calculation module 610 to determine the starting point and the ending point of the load surge. A difference of consecutive slopes in a cumulative sum curve is determined to obtain a set of critical request rate changes to identify the starting point and the ending point of the load surge. The change points in load patterns that contain some noise are also determined by the change point technique.

Figure 8:
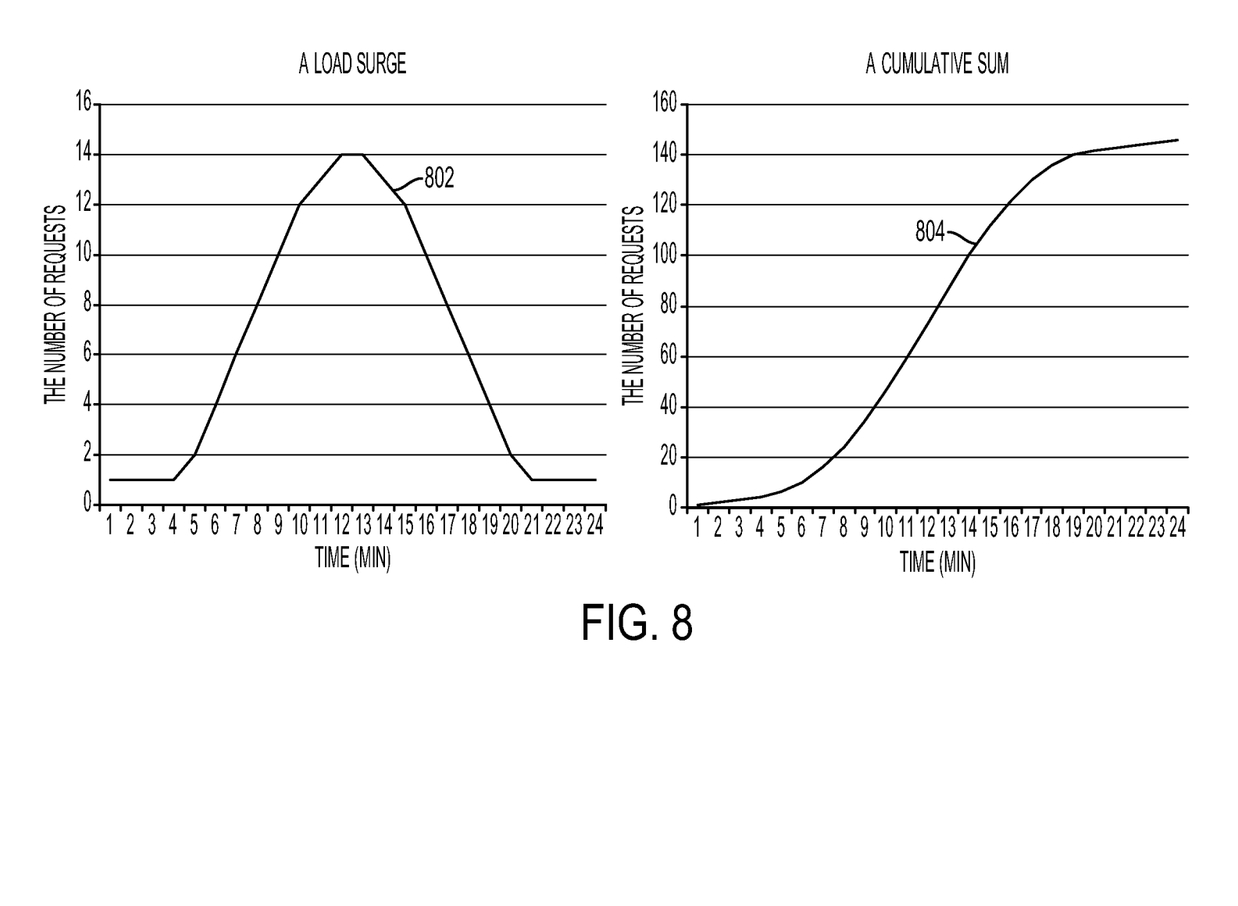
FIG. 8 depicts a load surge and a cumulative sum curve in accordance with at least one embodiment.

For example, FIG. 8 depicts a load surge 802 (such as, the total load pattern 502) and a corresponding cumulative sum curve 804. A threshold value that represents the steady state can be pre-defined. In an embodiment, when the number of requests is below the threshold value, the cumulative sum is not conducted, but once the number of requests is more than the threshold value, the cumulative sum is started and slopes are calculated. In another embodiment, a threshold slope value that represents steady state can be pre-defined. In the steady state, the slope value is small in the cumulative sum curve 804. However, once the load surge is started, the slope value increases in the cumulative sum curve 804. When the load surge goes to its ending point, the slope value decreases and reaches the threshold slope value in the cumulative sum curve 804. Using these ways, the load surge can be estimated. This is further explained in the description infra.

In an embodiment, in case of a noisy spike, the slope value increases suddenly and then, goes back to the threshold slope value quickly in the cumulative sum curve 804. Thus, these noises can be eliminated when these noises patterns can be pre-defined.

Once the load surge is found in the load pattern (e.g., the load surge depicted in the duration 402 in the load pattern 400a), the duration of the load surge is divided into a set of time intervals, and the size of a load in each interval is determined by the load calculation module 610. In an embodiment, a moving average filter technique is applied by the load calculation module 610 to estimate the size of the load in each interval of the impending load surge. However, other data mining or time series analysis techniques can be applied by the load calculation module 610 to estimate the size of the load without departing from the scope of the ongoing description.

Let $\{X_t, t=0, 1, 2, \ldots\}$ be number of requests in each time interval t. The equation is as follows:

$$y_t = y_{t-1} + \max((X_t - B), 0), y_0 = 0 \qquad \text{Equation (1)}$$

Where, B is the upper-bound of request rate in the steady state (i.e., absence of load surges.). t=0 corresponds to a steady state start time.

The equation (1) indicates that the number of requests will not be accumulated if the request rate in the interval is below B, and once the request rate increases, it will be accumulated until it decreases below B. When the load drops below B, a clock can be reset and the process is repeated to determine the size of the next load surge. The upper-bound B is obtained by tracking past steady states. To exclude noise (i.e., very small spikes) from the load pattern, a set of yt values, each of which satisfies yt>N, are only considered, where N can be empirically obtained.

To obtain the starting and the ending points of the load surge, a slope of the cumulative sum curve in a moving window is calculated as $\nabla S_i = \Delta C_i/w$ (where $\Delta C_i$ is an amount of cumulative sum increase in the moving window i, and w is a length of the moving window). In an embodiment, the slope is calculated by the load calculation module 610. In an embodiment the length of the moving window (w) is a tunable parameter. A difference of consecutive slopes is then determined by the load calculation module 610 as $D_i = \nabla S_i - \nabla S_{i-1}$. A local maximum value, max $\{D_i, 0<i<w\}$, is chosen as the starting point of the load surge. The method returns a most significantly changed point in a transition, from a steady state to the load surge. In an embodiment, there are multiple local maximum values, each of which is computed from different windows. In an embodiment, the first local maximum value is selected by the load calculation module 610 as the starting point. When the ending point of the cumulative sum is reached, TS, will be 0. Thus, the ending point of the load surge is obtained.

At step 704, a capacity of the service component S4 and the one or more pending requests at the service component S4 are calculated based on the load pattern. The capacity corresponds to the maximum number of requests that can be served by the service component S4 in a predefined time period. The size L of the one or more pending requests is calculated as:

$$L = \sum_{t=m}^{m+i} (\sum_{w=1}^{n} L(w,t) - C) + \sum_{t=m+i+1}^{e} \sum_{w=1}^{n} L(w,t) \qquad \text{Equation (2)}$$

Where, L (w, t) is the load of workflow w in the interval t, and C is the capacity of the service component S4.

The equation (2) indicates that the size L of the one or more pending requests is a sum of overloads (i.e., loads over the line 504 as shown in FIG. 5) and the rest of the current load surges. For example, as depicted in FIG. 5, the one or more pending requests is the sum of overloads (from $t_5$ to $t_{12}$) and the rest of the aggregated loads of three simultaneous load surges (from $t_{13}$ to $t_{20}$).

In an embodiment, the capacity and the size L of the one or more pending requests are calculated by the delay calculation module 612. The values of the capacity and the size L are stored into the database 616 by the delay calculation module 612.

At step 706, a first delay T(L) associated with the service component S4 is computed based on the capacity and the one or more pending requests (i.e., based on the size L). The first delay T(L) is computed by dividing the size L by the maximum throughput, which the service component S4 can handle with the capacity C.

At step 708, a second delay T(A) is computed based on the time period required to increase the capacity by implementing the one or more alternative adaptation techniques. Based on the size L of the one or more pending requests, a number of replicas and resources required to deal with the future simultaneous load are determined for implementing the alternative adaptation techniques. Based on the number of replicas and resources, the second delay T(A) is calculated.

At step 710, the insertion delay $D_T$ is determined based on the first delay T(L) and the second delay T(A). In an embodiment, the insertion delay $D_T$ is determined as the minimum of the first delay T(L) and the second delay T(A).

$$D_T = \min(T(L), T(A)) \qquad \text{Equation (3)}$$

In an embodiment, the first delay T(L), the second delay T(A), and the insertion delay $D_T$ are determined by the delay calculation module 612. The values of the first delay T(L), the second delay T(A), and the insertion delay $D_T$ are then stored in the database 616 by the delay calculation module 612.

At step 712, the insertion delay $D_T$ is distributed among the upstream service components (e.g., S1, S2, S3, S7, S8, S9, S12, and S13). In an embodiment, the insertion delay $D_T$ is distributed in a non-symmetric way among the upstream service components to avoid overloading of the service component S4.

In order to distribute the insertion delay $D_T$, it is determined where (e.g., in which upstream service component associated with the workflows 102) the insertion delay $D_T$ should be inserted. The determination is made based on a calculation of a total penalty $\Gamma_t$. The total penalty $\Gamma_t$, associated with the insertion of the insertion delay $D_T$ to requests, for the workflow w=1, 2, . . . , n, at time t is given by:

$$\Gamma_t = \Sigma_{w=1}^{n} \gamma_w(d(w,m), \ldots, d(w,t)) \qquad \text{Equation (4)}$$

Where $\gamma_w$ is a penalty associated with incrementally delaying requests to workflow w by times d(w,k) at times k=m, . . . ,t. In an embodiment, w=1 corresponds to the workflow 102a, w=2 corresponds to the workflow 102b, w=3 corresponds to the workflow 102c, and so on. The penalty function incorporates the incremental delays inserted at earlier times, from the moment the overload started at time m. The method propagates workloads to later times by delaying the different loads to the different workflows following a specific process.

In an embodiment, the total penalty $F_t$ is calculated by the delay distribution module 614 and the value of the total penalty $F_t$ is stored in the database 616.

A workflow load at the service component S4, at time t is $$L_t = \Sigma_{w=1}^{n} L(w,t) \qquad \text{Equation (5)}$$

The Sum goes over all workflows (1, . . . ,n) (e.g., the workflows 102) for which L(w,t)≠0. The method reduces the workload of workflow w, by delaying a number of requests and retaining a percentage $0 \leq p_w(t) \leq 1$ of requests, until the workflow load equals the capacity of the service component S4:

$$L'_t = \Sigma_{w=1}^{n} p_w(t) L(w,t) = C \qquad \text{Equation (6)}$$

The remaining requests $(1-p_w(t))L(w,t)$ are delayed by one time unit, and added to the workload of the next time period. Once the method has established which requests to delay at time t, the method continues to look at the workloads at time t+1, until the total load is smaller than the capacity of the service component S4.

The percentages $p_w$ that satisfy the load condition represented by the equation (6) and minimize the overall penalty represented by the equation (4) are determined by delaying the requests. The method of determining $p_w$, by delaying requests follows the following approaches.

In an embodiment, the higher the penalty for SLA violations, the smaller the inserted delay. Requests with the lowest associated penalty are first reduced, by delaying the requests. The requests are sorted by associated penalty functions γ from low to high. Load for requests with lowest associated penalties are denoted by $l_1(t)$. The requests with lowest associated penalties are delayed and remaining requests are kept. If:

$$p = \frac{L-C}{l_1} > 1 \qquad \text{Equation (7)}$$

Further, the method is continued with the group of requests with the next lowest associated penalties. The load of that group of requests is denoted as $l_2(t)$, and the method continues this process until there is a group k for which:

$$p = \frac{L - \sum_{j=1}^{k-1} l_j(t) - C}{l_k(t)} < 1 \qquad \text{Equation (8)}$$

In this case, the method does not need to delay the complete load $l_k(t)$, and only a percentage p needs to be delayed.

In an embodiment, if the penalties for SLA violations are the same for different requests to different workflows (e.g., the workflows 102), then the requests with a later arrival time will be delayed more. The requests are sorted by increasing arrival time and grouping them in arrival time intervals. The requests are then delayed within the latest arrival time interval first. Further, requests with the next latest arrival time are delayed, and the process is continued until conditions represented by the equation (8) are met again.

In an embodiment, if the penalties for SLA violations are the same and the request arrival times for the different workflows are the same, then a non-symmetric delay will be inserted based on random selection amongst the requests to the different workflows. The requests are reduced continuously for time t, in some random way across the remaining requests to the workflows, until the load at time is below the capacity C. Once the method has reduced the load at time t, by delaying the requests, the method then moves on to time t+1. The delayed requests are added to the loads L(w,t+1). The process continues until the load is below the capacity C.

In an embodiment, the workflow load $L_t$ and the percentages $p_w$ are calculated by the delay distribution module 614 and stored into the database 616.

Once the load calculation module 610 and the delay calculation module 612 figure out the time $t_m$, when the performance bottleneck (e.g., the load surge) is impending at the service component S4, the status of each upstream service component S1, S2, S3, S7, S8, S9, S12, and S13 at $t_m$ is determined. Intuitively, as the upstream service components S1, S2, S3, S7, S8, S9, S12, and S13 are close to the bottlenecked service component S4, these upstream service components have a higher chance to deal with the same load surge. Some upstream service components, which are far away from the bottlenecked service component S4, have already passed the load surge and are in a steady state. Therefore, the delay is inserted among the upstream service components that still cause the bottleneck.

In an embodiment, given the $t_m$, $t_s$ and $t_e$ of each upstream service components $u_i$ are checked, where $t_s$ and $t_e$ are the starting point and the ending point, respectively, of the load surge. If the condition, $t_s \le t_m < t_e$, is met, a delay is inserted into the upstream service component. The starting point of the delay and an amount of delay for each upstream service component is computed. To keep balancing execution times among the upstream service components, the insertion delay $D_T$ is divided based on a rate of each service's upper-bound execution time threshold over the sum of those upstream services' upper-bound thresholds.

Let $\{u_i, i=0, 1, 2, \ldots, k\}$ be the list of upstream service components where the delay will be injected and $\{d_i, i=0, 1, 2, \ldots, k\}$ be the corresponding delays. Given the insertion delay $D_T$, a sub-delay d, can be obtained as:

$$d_i = D \times e_i / \Sigma_{j=0}^{k} e_j \quad \text{Equation (9)}$$

Where, $e_i$ is the upper-bound execution time threshold of $u_i$.

In an embodiment, based on the above equations, $u_0$ has the starting time and ending time of a sub-delay $d_0$ as:

$$(t_m, t_m + d_0) \quad \text{Equation (10)}$$

$u_1$ has the starting time and ending time of a sub-delay $d_1$ as:

$$(t_m + d_0, t_m + d_0 + d_1) \quad \text{Equation (11)}$$

$u_2$ has the starting time and ending time of a sub-delay $d_2$ as:

$$(tm + d0 + d1, tm + d0 + d1 + d2) \quad \text{Equation (12)}$$

In an embodiment, the sub-delay d, is calculated by the delay distribution module 614. The calculated delays are then inserted in the associated service components by the delay distribution module 614 so that requests from them will not be received simultaneously at the service component S4.

In an embodiment, a predefined insertion delay is distributed among the upstream service components S1, S2, S3, S7, S8, S9, S12, and S13. Once the occurrence of the load surge at the service component S4 is determined by the load calculation module 610 at step 702, the predefined insertion delay is divided in to multiple different sub-delays. In an embodiment, the multiple different sub-delays are randomly defined by the delay calculation module 612. The multiple different sub-delays are then inserted in to the upstream service components S1, S2, S3, S7, S8, S9, S12, and S13 by the delay distribution module 614. Thus, the requests from the upstream service components S1, S2, S3, S7, S8, S9, S12, and S13 are not simultaneously received at the service component S4.

The disclosed methods and systems, as described in the ongoing description or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, an optical-disk drive, etc. The storage device may also be other similar means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN and the Internet. The computer system facilitates inputs from a user through input device, accessible to the system through an I/O interface.

The computer system executes a set of instructions that are stored in one or more storage elements, in order to process input data. The storage elements may also hold data or other information as desired. The storage element may be in the form of an information source or a physical memory element present in the processing machine.

The programmable or computer-readable instructions may include various commands that instruct the processing machine to perform specific tasks, such as the steps that constitute the method of the disclosure. The method and systems described can also be implemented using only software programming or hardware or by a varying combination of the two techniques. The disclosure is independent of the programming language and the operating system used in the computers. Instructions for the disclosure can be written in all programming languages including, but not limited to 'C', 'C++', 'Visual C++' and 'Visual Basic'. Further, the software may be in the form of a collection of separate programs, a program module with a larger program or a portion of a program module, as given in the disclosure. The software may also include modular programming in the form of object-oriented programming. The processing of input data by the processing machine may be in response to user commands, results of previous processing or a request made by another processing machine. The disclosure can also be implemented in various operating systems and platforms including, but not limited to, 'Unix', 'DOS', 'Android', 'Symbian' and 'Linux'.

The programmable instructions can be stored and transmitted on a computer-readable medium. The disclosure can also be embodied in a computer program product comprising a computer-readable medium, with the product capable of implementing the above methods and systems, or the numerous possible variations thereof.

The method, system, and computer program product, as described above, have numerous advantages. Some of these advantages may include, but are not limited to, addressing impending performance bottlenecks (e.g., the severe load surges) by providing an ad-hoc adaptation method, while other alternative adaptation techniques, such as, the dynamic resource provisioning technique, the prediction-based resource provisioning technique, and the re-planning technique can be prepared at the back-end. The method, system, and computer program product of the present disclosure greatly improves the performance of the system during sudden load surges by smartly rescheduling requests without any extra resource usage. Thus, a negative user experience caused by any inaccurate predictions can be avoided. Further, by smartly rescheduling requests (i.e., intelligently distributing the insertion delay among the upstream service components), the overloading of any service component can be avoided and hence a normal functionality of the overall system can be maintained.

Various embodiments of the method and system for handling a load on a service component in a network have been disclosed. It should be apparent, however, to those skilled in the art that many more modifications besides those already described are possible without departing from the inventive concepts herein. The embodiments, therefore, are not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilised, or combined with other elements, components, or steps that are not expressly referenced.

It will be appreciated by a person skilled in the art that the system, modules, and sub-modules have been illustrated and explained to serve as examples and should not be considered limiting in any manner. It will be appreciated that the variants of the above disclosed system elements, or modules and other features and functions, or alternatives thereof, may be combined to create many other different systems or applications.

Those skilled in the art will appreciate that any of the foregoing steps and/or system modules may be suitably replaced, reordered, or removed, and additional steps and/or system modules may be inserted, depending on the needs of a particular application, and that the systems of the foregoing embodiments may be implemented using a wide variety of suitable processes and system modules and are not limited to any particular computer hardware, software, middleware, firmware, microcode, etc.

The claims can encompass embodiments for hardware, software, or a combination thereof.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for handling requests in a network, the method comprising:
    extracting a load pattern at a first service component, wherein the first service component receives one or more requests from a plurality of upstream service components;
    calculating a capacity of the first service component and one or more pending requests at the first service component based on the load pattern, wherein the capacity corresponds to a maximum number of requests served by the first service component in a predefined time period;
    computing a first delay associated with the first service component based on the capacity and the one or more pending requests;
    computing a second delay based on a time period required to increase the capacity by applying one or more alternative adaptation techniques;
    determining an insertion delay based on the first delay and the second delay; and
    distributing the insertion delay among the plurality of upstream service components such that requests from the plurality of upstream service components are not simultaneously received at the first service component.

2. The method of claim 1, wherein the plurality of upstream service components receives service requests from one or more workflows.

3. The method of claim 1, wherein the one or more requests constitutes a load at the first service component.

4. The method of claim 1 further comprising calculating a sub-delay corresponding to each of the plurality of upstream service components based on the insertion delay.

5. The method of claim 4, wherein the distributing comprises inserting into each of the plurality of upstream service components the corresponding sub-delay.

6. The method of claim 1, wherein the extracting comprises determining a starting point and an ending point of a load surge at the first service component.

7. The method of claim 1, wherein the one or more alternative adaptation techniques comprise at least one of dynamic resource provisioning technique, prediction-based resource provisioning technique, or a re-planning technique.

8. The method of claim 1, wherein the insertion delay corresponds to a minimum of the first delay and the second delay.

9. A system for handling requests in a network, the system comprising:
    one or more processors operable to:
    extract a load pattern at a first service component, wherein the first service component receives one or more requests from a plurality of upstream service components;
    calculate a capacity of the first service component and one or more pending requests at the first service component based on the load pattern, wherein the capacity corresponds to a maximum number of requests served by the first service component in a predefined time period;
    determine an insertion delay based on at least one of the capacity, the one or more pending requests, or a time period required to increase the capacity by one or more alternative adaptation techniques; and
    distribute the insertion delay among the plurality of upstream service components such that requests from the plurality of upstream service components are not simultaneously received at the first service component.

10. The system of claim 9, wherein the plurality of upstream service components receives service requests from one or more workflows.

11. The system of claim 9, wherein determining the insertion delay comprises:
    calculating a first delay based on the capacity and the one or more pending requests; and
    calculating a second delay based on the time period required to increase the capacity by applying the one or more alternative adaptation techniques.

12. The system of claim 11, wherein the insertion delay corresponds to a minimum of the first delay and the second delay.

13. The system of claim 9, wherein the one or more alternative adaptation techniques comprise at least one of the dynamic resource provisioning technique, a prediction-based resource provisioning technique, or a re-planning technique.

14. A computer program product for use with a computer, the computer program product comprising a non-transitory computer readable medium, wherein the non-transitory computer readable medium stores a computer program code for handling requests in a network, wherein the computer program code is executable by one or more processors to:
    extract a load pattern at a first service component, wherein the first service component receives one or more requests from a plurality of upstream service components;
    calculate a capacity of the first service component and one or more pending requests at the first service component based on the load pattern, wherein the capacity corresponds to a maximum number of requests served by the first service component in a predefined time period;

determine an insertion delay based on at least one of the capacity, the one or more pending requests, or a time period required to increase the capacity by one or more alternative adaptation techniques; and distribute the insertion delay among the plurality of upstream service components such that requests from the plurality of upstream service components are not simultaneously received at the first service component.

15. The computer program product of claim 14, wherein determining the insertion delay comprises:

calculating a first delay based on the capacity and the one or more pending requests; and calculating a second delay based on the time period required to increase the capacity by applying the one or more alternative adaptation techniques.

16. The computer program product of claim 15, wherein the insertion delay corresponds to a minimum of the first delay and the second delay.

17. The computer program product of claim 14, wherein the computer program code is further executable by the one or more processors to compute a starting point and an ending point of a load surge at the first service component.

* * * * *